July 31, 1962

H. W. HULTS 3,047,682

ELECTRIC SWITCHES

Filed July 18, 1958

INVENTOR.
HAROLD W. HULTS
BY H R Rather
ATTORNEY

July 31, 1962  H. W. HULTS  3,047,682
ELECTRIC SWITCHES
Filed July 18, 1958  5 Sheets-Sheet 2

INVENTOR.
HAROLD W. HULTS
BY H.R.Rather
ATTORNEY

July 31, 1962   H. W. HULTS   3,047,682
ELECTRIC SWITCHES
Filed July 18, 1958
5 Sheets-Sheet 3

INVENTOR.
HAROLD W. HULTS
BY
H. R. Rather
ATTORNEY

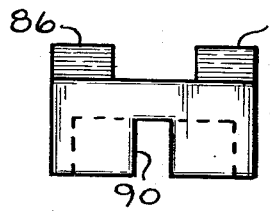
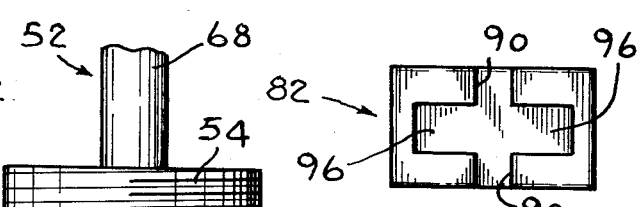
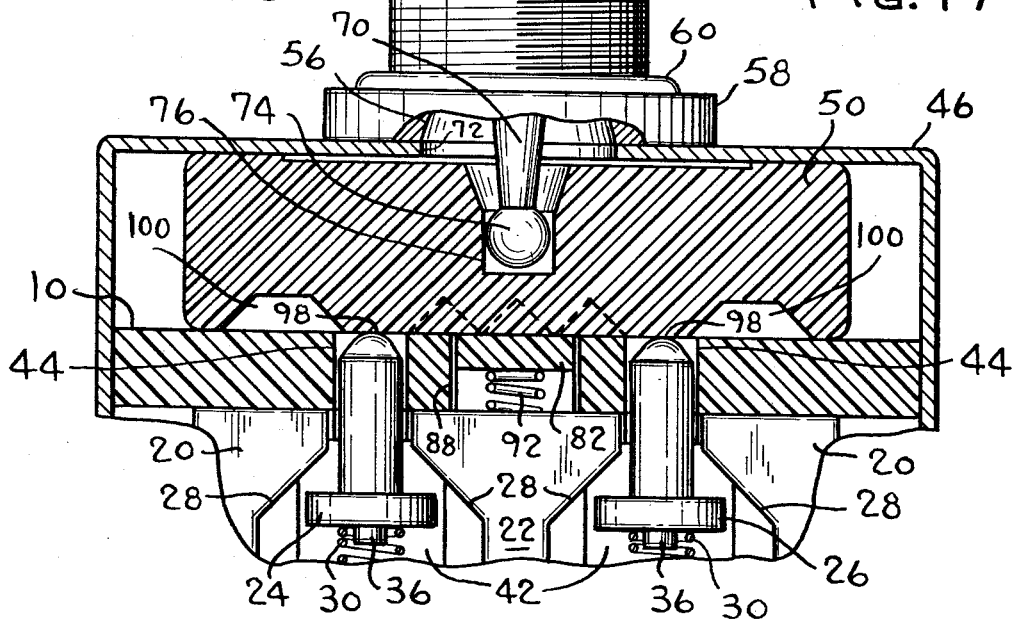
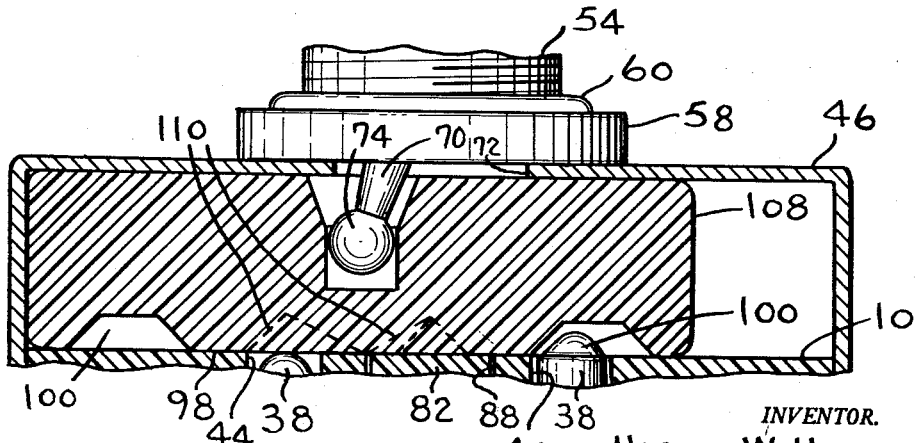

July 31, 1962  H. W. HULTS  3,047,682
ELECTRIC SWITCHES
Filed July 18, 1958  5 Sheets-Sheet 5

INVENTOR.
HAROLD W. HULTS
BY H. R. Rather
ATTORNEY

United States Patent Office 3,047,682
Patented July 31, 1962

3,047,682
ELECTRIC SWITCHES
Harold W. Hults, Milwaukee, Wis., assignor to Cutler-Hammer, Inc., Milwaukee, Wis., a corporation of Delaware
Filed July 18, 1958, Ser. No. 749,357
7 Claims. (Cl. 200—16)

This invention relates to improvements in electric switches, and although not limited thereto the invention relates more particularly to improvements in miniature switches of the toggle lever operated type wherein the switch mechanism is sealed in a suitable casing against the entry of moisture and dust.

It is an object of this invention to provide a switch of this type which has a positive action at the contacts and relatively high contact pressure to break welded contacts and reduce contact resistance.

Another object is to provide a compact switch with a positive "feel" having a minimum number of switch parts, including like parts, which may be combined in selected groups to provide switches having a wide variety of operating characteristics.

Another object is to provide improved sealing means for actuator openings in switch casings which are long lived, low cost and highly effective.

These objects are attained by mounting a bridging contactor for reciprocal movement in and out of contact with a pair of spaced stationary contacts. The stationary contacts have contact surfaces which are inclined towards each other causing the bridging contactor to be wedged between such inclined surfaces to thereby produce a relatively high contact pressure.

A cam actuator block mounted for reciprocal straight-line movement normal to the movement of the bridging contactor is actuated by a toggle lever mounted in a bushing in the switch casing. The block has a switch actuating cam surface for actuating the bridging contactor and an indexing cam surface which cooperates with a spring-loaded index pawl to provide a positive switch "feel." By simply varying the configuration of the cam surfaces on the cam actuator block, a wide variety of switch operating characteristics can be attained.

One means for sealing the operating toggle lever in the mounting bushing includes an elastic sealing member seated in a groove in such bushing with the sealing member and lever maintained in proper position by a retaining ring held by a shoulder formed on the inner wall of the bushing. A second sealing means includes a substantially ring-shaped sealing member compressed into sealing engagement with the lever by a shoulder formed at one end of the bushing and a sleeve inserted and fastened in the other end of the bushing.

Other objects and advantages will be pointed out in, or be apparent from the specification and claims, as will obvious modifications of the several embodiments shown in the drawings, in which:

FIG. 8 is a horizontal sectional view taken on line 8—8 of FIG. 6;

FIG. 9 is a fragmentary sectional view similar to FIG. 1 but with the cam actuator block in the center position with both contacts Off;

FIG. 10 is a fragmentary sectional view similar to FIG. 1 but with a modified cam actuator block having no center position;

FIGS. 18 and 19 are a side elevation view and a bottom plan view, respectively, of the indent pawl of the switch; and FIG. 20 is a fragmentary sectional view taken along line 20—20 of FIG. 6.

Figure 1:
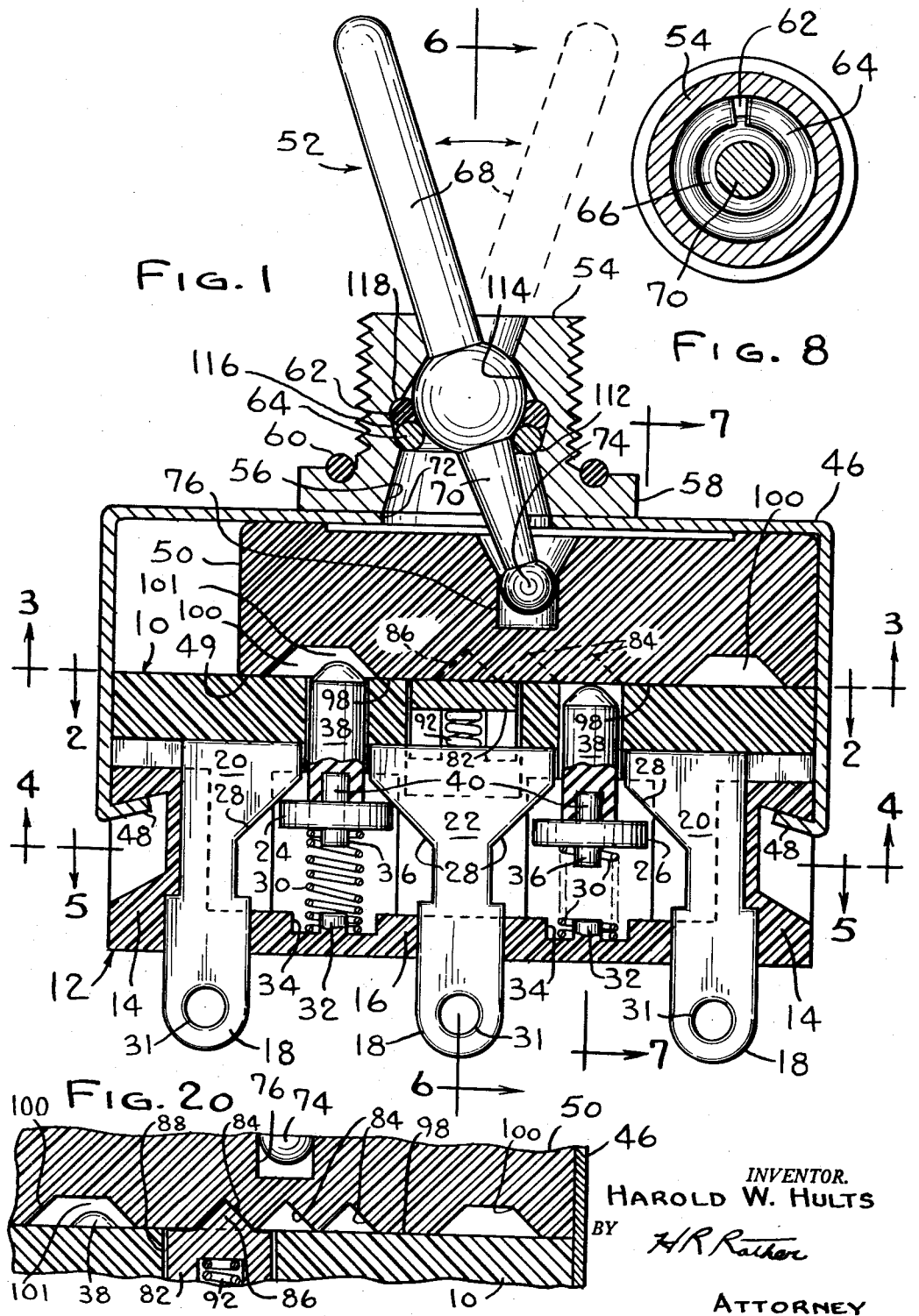
FIG. 1 is an enlarged vertical sectional view of a toggle switch constructed in accordance with my invention with one contact On and the other contact Off, the section being taken on line 1—1 of FIG. 6.
Figure 2:
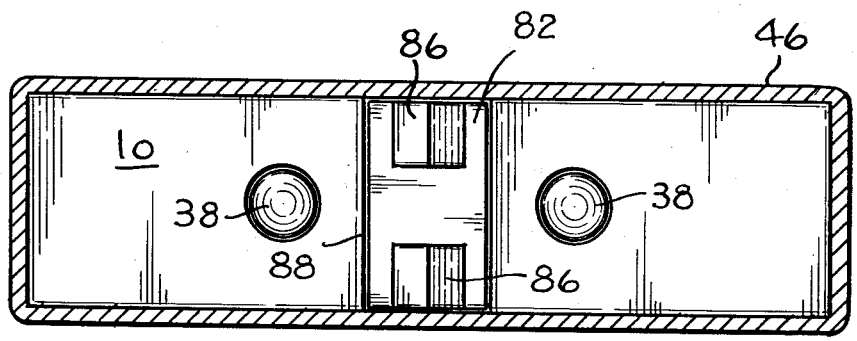
FIG. 2 is a horizontal sectional view taken on line 2—2 of FIG. 1.
Figure 3:
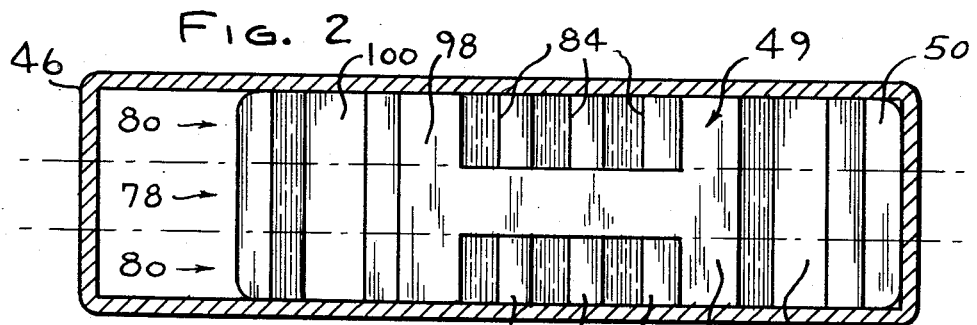
FIG. 3 is a horizontal sectional view taken on line 3—3 of FIG. 1.
Figure 4:
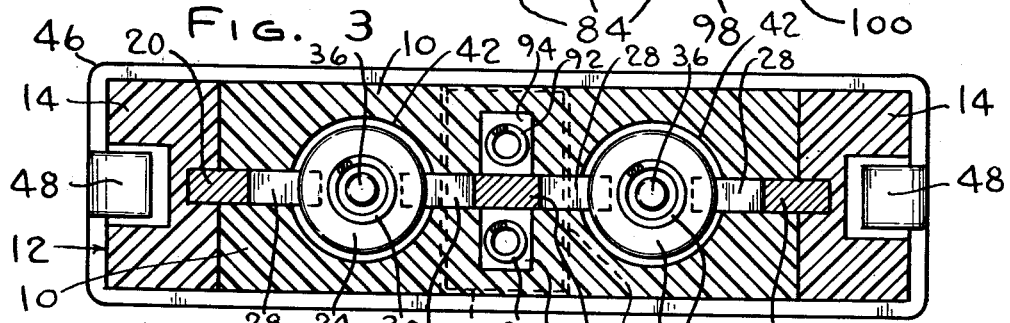
FIG. 4 is a horizontal sectional view taken on line 4—4 of FIG. 1.
Figure 5:
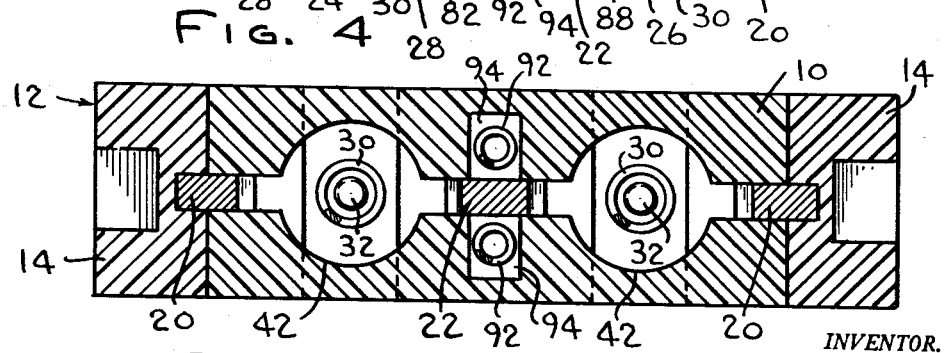
FIG. 5 is a horizontal sectional view taken on line 5—5 of FIG. 1.
Figure 6:
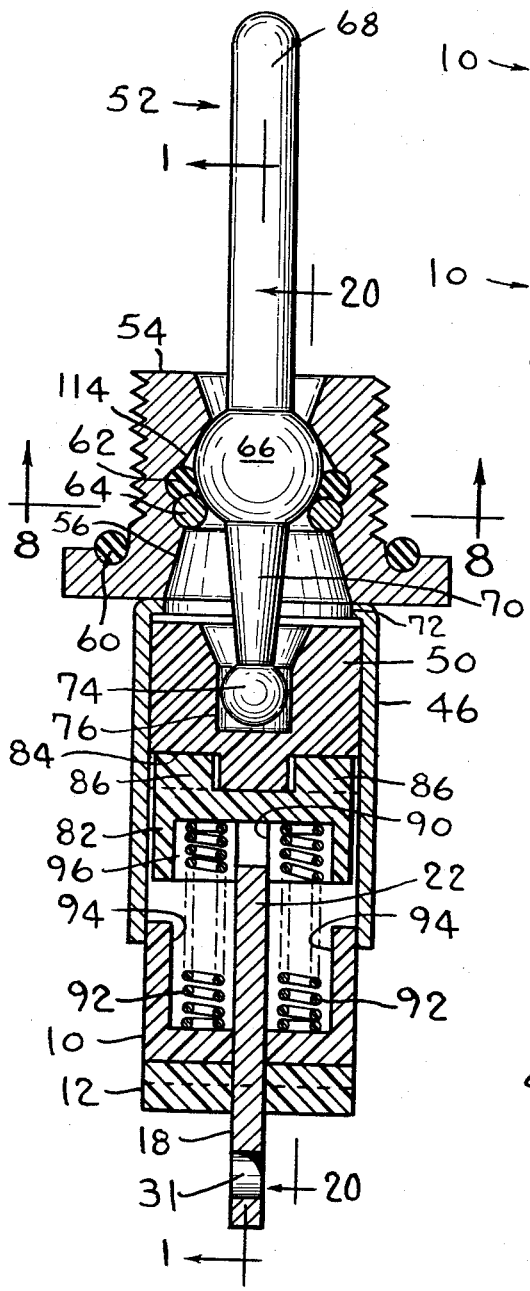
FIG. 6 is a vertical sectional view taken on line 6—6 of FIG. 1.
Figure 16:
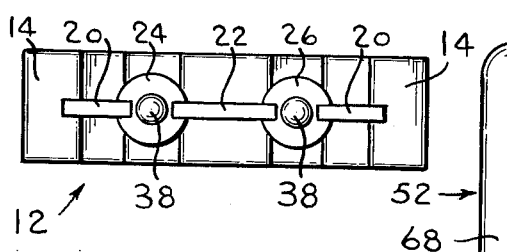
FIGS. 16 and 17 are a top plan view and a side elevation view, respectively, of a subassembly of the lower base member and the stationary contact-terminals of the switch.
Figure 17:
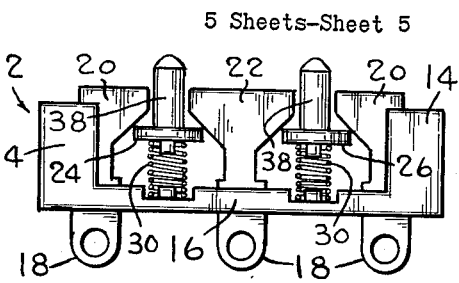

Referring first to the switch shown in FIGS. 1–9, inclusive, the numerals 10 and 12 designate interfitting upper and lower base members, respectively, molded from a suitable insulating material. Lower base member 12 (FIGS. 16 and 17) is of substantially U-shape (FIG. 17) having upstanding end portions 14 connected by a substantially flat horizontal portion 16. Horizontal portion 16 is provided with three aligned openings to accommodate terminal portions 18 of a pair of outer stationary contact strips 20 and a central common stationary contact strip 22. Two disc-shaped movable contacts 24 and 26 are mounted between common stationary contact 22 and the respective outer stationary contacts 20 and are biased into bridging contact with vertically inclined edges 28 of the stationary contacts as shown in FIGS. 1 and 17 by coil compression springs 30. Openings 31 in terminal portions 18 of the stationary contacts shown in FIGS. 1 and 6 are provided for connection to external circuits to be controlled by the switch and circuits can be completed from common contact 22 to either or both outer contacts 20 by means of bridging contacts 24 and 26. Projections 32 in grooves 34 of portion 16 shown in FIGS. 1 and 5 and projections 36 on the bottom face of contacts 24 and 26 shown in FIGS. 1 and 4 serve to center and hold springs 30 in place. Plungers 38 for actuating the movable contacts are fitted on projections 40 on the top face of the contacts, as shown in FIGS. 1 and 17.

The contacts are preferably formed of fine silver, or of similar metal, having good electrical conductivity and low contact resistance. Inclined edges 28 of adjacent stationary contacts angle upwardly toward each other to form a wedge into which the movable contacts are urged by return springs 30. This arrangement has several important advantages. The relatively small area of contact and the wedge-like arrangement of inclined edges 28 produces a very high contact pressure for a given spring force to thereby lower contact resistance. A positive shear force and a slight wiping action occur at the contacts by virtue of the inclined angle of the stationary contact surfaces to effectively break welded contacts and keep the contacts free of foreign particles and products of corrosion. Furthermore, the particular arrangement and configuration of the contacts provides an extremely compact yet reliable switch structure so important in a miniature aircraft switch which is the specific application for which this switch was designed.

Figure 14:
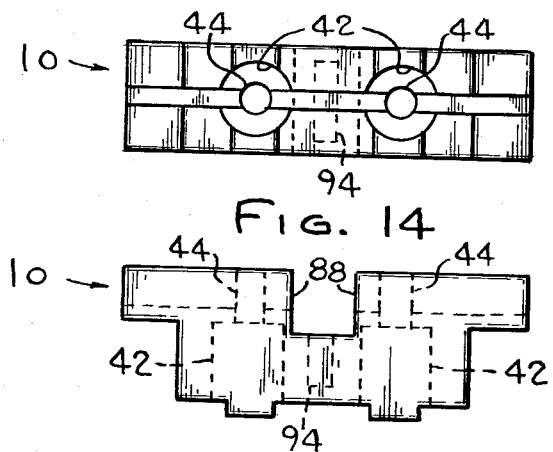
FIGS. 14 and 15 are a bottom plan view and a side elevation view, respectively, of the upper base member of the switch.
Figure 15:
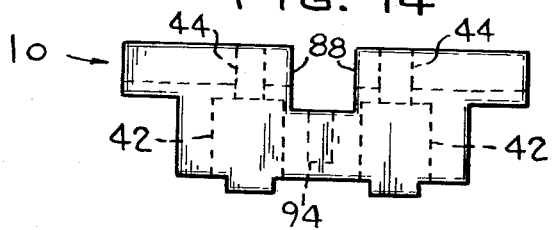
Figure 7:
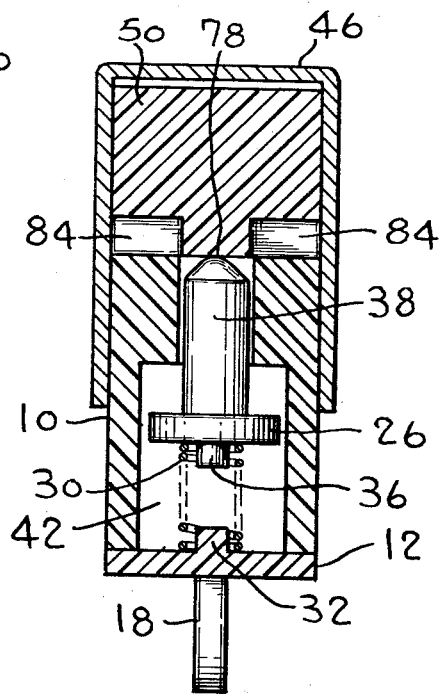
FIG. 7 is a vertical sectional view taken on line 7—7 of FIG. 1.

After the switch mechanism is subassembled in lower base member 12, as described above, the upper base member 10 (FIGS. 14 and 15) is fitted over the subassembly as shown in FIG. 1. Upper base member 10 has a pair of downwardly opening recesses 42 and a pair of aligned upwardly opening recesses 44 which cooperate with lower base member 12 to enclose and guide the movable contact and plunger assemblies.

A stamped sheet metal housing member 46 of substantially inverted cup-shape and of substantially rectangular contour to conform to the shape of the assembled base members is secured to lower base member 12 by means of integral tabs 48 extending from the lower edge of housing 46 and bent to engage downwardly facing shoulders formed in the sides of the lower base member. Thus, as shown in FIG. 1, base members 10 and 12 are held snugly together against the bottom face 49 of a cam actuator block 50 slidably mounted between such base members and the top of the housing to provide a dust-tight seal for the switch contacts.

An operating toggle lever 52 for the switch is mounted in a threaded bushing 54 having an axial opening 56 therethrough and a flange 58 at the lower end thereof fastened to the top of housing 46 by welding or other suitable means. A sealing member 60 seated in a groove in the top of flange 58 provides a water-tight seal when the switch is mounted in a suitable panel (not shown). An elastic sealing member 62, held in place by a retaining ring 64, serves to seal lever 52 in the bushing as described in detail hereinafter.

Operating toggle lever 52 consists of a somewhat enlarged, generally spherical portion 66 shown in FIG. 6 disposed within axial opening 56 of bushing 54; an operating handle portion 68 formed integrally with and extending upwardly from spherical portion 66 and outwardly beyond the bushing; and an integral shank portion 70 which tapers downwardly from spherical portion 66 through an opening 72 in the housing to a generally spherical portion 74 at the end of the lever. A reciprocal sliding motion is imparted to cam actuator block 50 by lever 52 by virtue of the engagement of spherical portion 74 at the end of the lever with a cylindrical recess 76 in the top face of the block.

Cam actuator block 50 (FIGS. 1, 3 and 6), preferably of a molded nylon material, has a substantially rectangular contour with a bottom face 49 on which is formed a first cam surface 78 for actuating the switch contacts and a second cam surface 80 cooperating with a spring loaded index pawl 82 to provide a positive "feel" as the switch is actuated from one position to another by lever 52. As shown in dotted lines on FIG. 3, switch actuating cam surface 78 extends the length of surface 49 along the central portion thereof and indexing cam surface 80 extends the length of surface 49 on either side of the switching cam surface.

The cam surfaces of block 50 are designed to provide a three-position switch having an On-Off-On operation. A positive "feel" in all three positions is provided by grooves 84 in indexing surface 80 adapted for engagement by an indent pawl 82. Pawl 82 (FIGS. 18 and 19) is molded from a suitable insulating material and has a rectangular cross-section tapered to form a pair of spaced ridges 86, 86 which engage grooves 84 on either side of switching cam surface 78. The pawl is mounted for reciprocal sliding movement in a vertical notch 88 in base member 10 (FIG. 15) with the top edge of common contact strip 22 riding in a notch 90 in the bottom of pawl 82 (FIG. 18) to guide the pawl and prevent binding thereof in notch 88. A pair of coiled compression springs 92 held in place by recesses 94 in upper base member 10 (FIGS. 14 and 15) and recesses 96 in the bottom of the pawl (FIG. 19) serve to bias the pawl upwardly towards the indexing cam surface 80 of the actuator block.

The reciprocating bridging contacts 24 and 26 are actuated in the desired sequence by flats 98 and grooves 100 formed in switching cam surface 78 against which switch plungers 38 are biased by springs 30. With cam actuator block 50 actuated to the right (FIG. 1), contact 24 will be in the On position with its associated plunger extending into a groove 100 and contact 26 will be in the Off position with its associated plunger depressed by a flat 98. As block 50 is moved to its center position (FIG. 9), contact 26 will remain Off and contact 24 will be depressed to the Off position as its plunger rides up on a flat 98. Further actuation of the block to the left will cause contact 26 to move up to the On position with contact 24 remaining in the Off position.

As shown in FIG. 1, a suitable wear allowance for the switch contacts is obtained by providing a space 101 between the top of plungers 38 and the bottom of grooves 100 when the contacts are in the On position.

Figure 11:
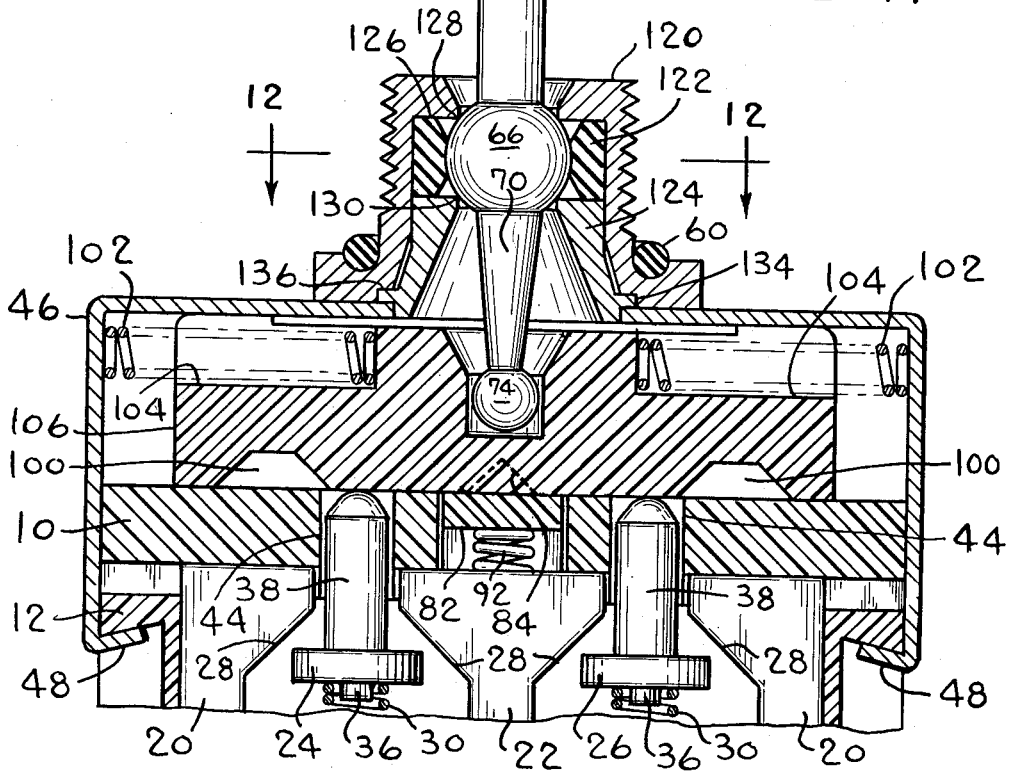
FIG. 11 is a fragmentary sectional view similar to FIG. 1 but showing a second modification of the actuator block with a pair of return springs for momentary operation and also showing a different sealing means for the toggle lever.

A Momentary On-Off-Momentary On operation can be obtained by a slight modification of the indexing cam surface on the actuator block and the installation of suitable return springs 102, as shown in FIG. 11. Return springs 102 are mounted in grooves 104 in a modified actuator block 106 between the end walls of the grooves and the sides of housing 46. The indexing cam surface of block 106 has only a single groove 84 at the center to allow the block to return readily from either its right or left positions under the bias of return springs 102. It should be understood, however, that an indexing cam surface the same or similar to that shown in FIGS. 1 and 2 could be utilized to produce a momentary action provided that return springs 102 were of sufficient strength to overcome the force of index pawl springs 92. The switching cam surfaces of blocks 50 (FIG. 1) and 106 (FIG. 11) are identical producing the same sequence of switch operation in both cases.

FIG. 10 shows a cam actuator block 108 embodying a second modification of the indexing cam surface providing a two-position switch having an On-None-On operation (with no center position). This is accomplished by an indexing cam surface having two symmetrically arranged grooves 110, as shown, and a switching cam surface the same as that on blocks 50 and 106, previously described. A momentary action in either direction could be incorporated into this modification by simply installing a return spring of suitable length between the block and the housing.

It should be noted that the various modifications of the indexing cam surface illustrated in the drawings and described above can be incorporated without making any changes to the index pawl assembly or any other parts of the switch. Furthermore, it is important to note that the indexing and switching cam surfaces can be made to function separately and independently over the entire length of the actuator block. Therefore, although grooves 100 in switching cam surface 78 are shown extending the entire width of the block, these grooves need only extend the width of the switching cam surface itself in cases where the outer end portions of the indexing cam surface 80 were needed.

While only a single example of a switching cam surface is illustrated and described herein, it will be apparent that almost any desired sequence of switch actuation can be produced by varying the arrangement and number of flats and grooves of such cam surface. For example, by simply adding a groove to the switching cam surface in the proper place the contacts 24 and 26 could both be made to close at the same time as the cam block is moved from center position to either the left or right position. Similarly, by adding two grooves both contacts could be made to close at the same time as the cam block is moved from center position to both the left and right positions.

The switch could be made with a multipole arrangement if desired by simply widening the cam actuator block to add the necessary cam surfaces and enlarging the base members to accommodate additional rows of contact assemblies. Similarly, additional switching functions could be provided by extending the block and housing lengthwise to accommodate additional switch assemblies in line with the three stationary contact segments shown.

A snap action at the contacts is not one of the objects of this invention. However, the switch could be readily adapted for operation with a snap action by modifying the connection between spherical portion 74 at the end of lever 52 and the cam actuator block as shown and described in my co-pending application Serial No. 647,518, filed March 21, 1957, and assigned to Cutler-Hammer, Inc., the assignee of this application.

Referring now to the means for sealing operating toggle lever 52 in bushing 54 as shown in FIGS. 1, 6 and 8, the lever is centered and supported in the bushing by retaining ring 64 seated against a circular shoulder 112 formed in the wall of bushing opening 56. Ring 64 is of circular cross-section and bears against the lower part of spherical portion 66 of the lever to thereby urge the upper part of such spherical portion against an upwardly and inwardly inclined surface 114 on the wall of the bushing opening. A surface 116 on the wall of the bushing opening tapers upwardly and outwardly from shoulder 112 forming a groove at the intersection of surfaces 114 and 116 in which elastic sealing member 62 is seated. A slight shoulder 118 can be formed at the intersection of the tapered surfaces to further confine sealing member 62. The sealing member, preferably of the O-ring type, is compressed into sealing engagement with spherical portion 66 by ring 64 as the ring tries to expand upwardly along tapered surface 116. A very simple, inexpensive and effective sealing arrangement results.

Figure 12:
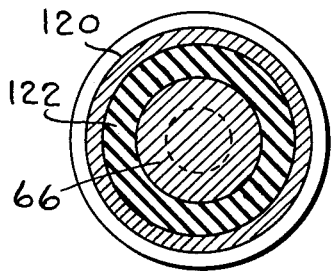
FIG. 12 is a horizontal sectional view taken along line 12—12 of FIG. 11.
Figure 13:
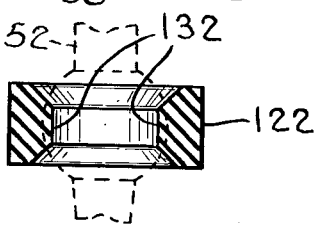
FIG. 13 is a vertical sectional view of the sealing member shown in FIGS. 11 and 12 showing the relationship between the internal diameter of the member and the diameter of the spherical portion of the toggle lever prior to assembly of the two parts.

A second arrangement for sealing lever 52 in a somewhat modified bushing 120 is shown in FIGS. 11, 12 and 13 wherein an elastic sealing member 122 and the operating lever are effectively centered and supported in the bushing by a sleeve 124. A downwardly facing shoulder 126 is formed at the top of the inside surface of the bushing for retaining sealing member 122, spherical portion 66 of lever 52 and sleeve 124 inserted from the bottom of the bushing in that order. Edge 128 of the shoulder and edge 130 of the sleeve bear against spherical portion 66 of the lever and serve to properly position the lever in the bushing without unduly resisting movement of the lever in the bushing. Sealing member 122 is of substantially ring-shape having an inside surface which tapers to a nose 132. Sealing engagement is established between nose 132 and spherical portion 66 by making the diameter of spherical portion 66 slightly greater than the inside diameter of sealing member 122 (FIG. 13), and by compressing the sealing member slightly between shoulder 126 and the end of sleeve 124. The axial position of sleeve 124 in the bushing for properly supporting lever 52 and compressing sealing member 122 is established and maintained by a tongue 134 held between a shoulder 136 formed in the bottom end of the bushing and the top of housing 46.

Although several embodiments of the present invention have been illustrated and described, it will be apparent to those skilled in the art that various changes and modifications may be made therein without departing from the spirit of the invention or from the scope of the appended claims.

I claim:

1. In an electric switch, insulating base means, a pair of stationary contacts mounted in said base means, said stationary contacts comprising contact surfaces extending toward one another and being inclined in a first direction, a bridging contactor mounted between said stationary contacts and comprising cam follower means extending in said first direction beyond said base means, resilient means biasing said bridging contactor in said first direction electrically to connect said inclined surfaces of said stationary contacts, a cam actuator block mounted on said base means for reciprocal movement transverse to said first direction, said cam actuator block comprising a cam surface effective when said block is moved in one direction to actuate said cam follower means and to move said bridging contactor opposite to said first direction against the force of said resilient means to disengage said bridging contactor from the inclined surfaces of said stationary contacts, said cam actuator block further comprising a depression for freely receiving said cam follower means when said block is moved back in the other direction, and said depression being deeper than the normal extension of said cam follower means beyond said base means to provide for wear allowance between the inclined surfaces of said stationary contacts and said bridging contactor.

2. The invention defined in claim 1, wherein said cam follower means comprises a round rod-like plunger rigidly secured to said bridging contactor, and said base means is provided with a round hole for slidably accommodating said plunger, and said bridging contactor comprises a disc-shaped member coaxially secured to one end of said plunger so that its opposite peripheral edges engage the inclined surfaces of said stationary contacts.

3. The invention defined in claim 1, wherein said base means comprises an enclosed cavity therein, said stationary contacts extending from one side of said base means into said cavity and comprising terminal portions on the exterior of said base means, said cam follower means extending from said cavity through the opposite side of said base means for engagement by said cam actuator block, and said reilient means being compressed between the interior of said one side of said base means and said bridging contactor within said cavity.

4. The invention defined in claim 3, wherein said stationary contacts comprise flat plates arranged in a common plane with the edges of said plates which face each other forming said inclined contact surfaces, and the longitudinal axis of said cam follower means also being in said common plane.

5. In an electric switch, insulating base means having an enclosed cavity therein, a plurality of spaced stationary contact members having terminal portions exteriorly on one side of said base means and respective contact portions within said cavity, said contact portions of adjacent contact members extending toward one another and having edges inclined toward the other side of said base means, bridging contactors between the inclined edges of said contact portions, compression springs between the interior of said one side of said base means and the respective bridging contactors biasing the latter against the associated inclined edges, cam followers secured to the respective bridging contactors and slidably extending through holes in the other side of said base means and projecting a predetermined distance beyond the latter when said bridging contactors engage said inclined edges, cam actuator means slidable on said other side of said base means transversely of said cam followers, said cam actuator means having a cam surface comprising means effective when said cam actuator means is slid on said base means for depressing at least one of said cam followers to disengage the associated bridging contactor from the corresponding stationary contact members, said cam surface comprising a depression for each of said cam followers deeper than said predetermined distance of projection thereof to provide for wear allowance between said bridging contactors and the inclined edges of said stationary contact members, spring-biased indexing means extending from said cavity through said other side of said base means between said cam followers into compressive engagement with said cam actuator means, and said cam actuator means comprising a cam surface cooperating with said indexing means to retain said cam actuator means in different transverse operating positions.

6. The invention defined in claim 5, wherein said spring-biased indexing means comprises an indexing plunger slidably accommodated in an apertrue in said other side of said base means, and compression spring means between the interior of said one side of said base means and said indexing plunger for biasing the latter into engagement with the indexing cam surface of said cam actuator means.

7. In an electric switch, a casing comprising first and second insulating base members and a sheet metal member overlying portions of said base members and securing them in assembled relation, a pair of stationary contacts mounted on said first base member, a bridging contactor mounted on said first base member for reciprocal movement into and out of engagement with said stationary contacts, biasing means urging said bridging contactor in one direction with respect to said stationary contacts, said second base member having a substantially flat portion overlying said first base member, said stationary contacts, said contactor and said biasing means, a cam actuator block mounted between a portion of said sheet metal member and said flat portion of said second base member for reciprocal sliding movement on the latter portion and having a switch actuating cam surface and an indexing cam surface, a cam follower operatively connected to said bridging contactor and extending through an opening in said flat portion of said second base member and actuated by said switching cam surface to move said bridging contactor against the bias of said biasing means as said cam actuator block is reciprocated, and a spring loaded index pawl engaging said indexing cam surface to provide "feel" to the switch as said cam actuator block is reciprocated between positions, and means mounted on said portion of said sheet metal member and having driving connection with cam actuator block for reciprocating the latter.

References Cited in the file of this patent

UNITED STATES PATENTS

| | | |
|---|---|---|
| 585,915 | Johnston | July 6, 1897 |
| 1,175,630 | Hare | Mar. 14, 1916 |
| 1,844,731 | Wittingham | Feb. 9, 1932 |
| 1,952,153 | Young | Mar. 27, 1934 |
| 1,957,106 | Kerzak | May 1, 1934 |
| 1,995,671 | Dashner | Mar. 26, 1935 |
| 2,357,971 | Robbins | Sept. 12, 1944 |
| 2,488,670 | Koenig | Nov. 22, 1949 |
| 2,496,145 | Bently | Jan. 31, 1950 |
| 2,589,025 | Phelps | Mar. 11, 1952 |
| 2,648,733 | Billings | Aug. 11, 1953 |
| 2,759,075 | Hults | Aug. 14, 1956 |
| 2,791,647 | Newcomb | May 7, 1957 |
| 2,814,703 | Martin | Nov. 26, 1957 |
| 2,924,685 | Burch | Feb. 9, 1960 |